(12) United States Patent
Eldred et al.

(10) Patent No.: US 12,227,530 B2
(45) Date of Patent: Feb. 18, 2025

(54) METHOD OF PREPARING FUNCTIONAL ORGANOSILANOL COMPOUNDS

(71) Applicants: Dow Silicones Corporation, Midland, MI (US); Dow Global Techologies LLC, Midland, MI (US)

(72) Inventors: Donald V. Eldred, Midland, MI (US); Matthew Jeletic, Midland, MI (US); John Roberts, Midland, MI (US); Andre Yvon-Bessette, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 800 days.

(21) Appl. No.: 17/418,960

(22) PCT Filed: Dec. 20, 2019

(86) PCT No.: PCT/US2019/068025
§ 371 (c)(1),
(2) Date: Jun. 28, 2021

(87) PCT Pub. No.: WO2020/142281
PCT Pub. Date: Jul. 9, 2020

(65) Prior Publication Data
US 2022/0112223 A1     Apr. 14, 2022

Related U.S. Application Data

(60) Provisional application No. 62/786,885, filed on Dec. 31, 2018.

(51) Int. Cl.
| | | |
|---|---|---|
| *C07F 7/08* | (2006.01) | |
| *B01J 23/44* | (2006.01) | |
| *B01J 27/20* | (2006.01) | |
| *B01J 31/22* | (2006.01) | |

(52) U.S. Cl.
CPC ............... *C07F 7/087* (2013.01); *B01J 23/44* (2013.01); *B01J 27/20* (2013.01); *B01J 31/2295* (2013.01); *C07F 7/0874* (2013.01); *B01J 2531/821* (2013.01); *B01J 2531/827* (2013.01)

(58) Field of Classification Search
CPC ...... C07F 7/087; C07F 7/0838; C07F 7/0874; C07F 7/0876; C07F 7/0872; C07F 7/0836; B01J 23/44; B01J 27/20; B01J 31/2295; B01J 2531/821; B01J 2531/827
USPC ...................................................... 549/215
See application file for complete search history.

(56) References Cited

U.S. PATENT DOCUMENTS

| | | |
|---|---|---|
| 3,799,962 A | 3/1974 | Lewis |
| 4,082,726 A | 4/1978 | Mine et al. |
| 4,742,177 A | 5/1988 | Yamamoto et al. |
| 5,484,950 A | 1/1996 | Crivello |
| 5,614,640 A | 3/1997 | Okawa |
| 6,013,753 A | 1/2000 | Krahnke et al. |
| 6,127,502 A | 10/2000 | Krahnke et al. |
| 6,265,518 B1 | 7/2001 | Krahnke et al. |
| 6,265,598 B1 | 7/2001 | Kimura et al. |
| 6,420,504 B1 | 7/2002 | Yoshitake et al. |
| 6,495,708 B1 | 12/2002 | Yang et al. |
| 2002/0099232 A1 | 7/2002 | Ozai et al. |
| 2006/0074212 A1 | 4/2006 | Chapman et al. |
| 2012/0177402 A1 | 7/2012 | Taniguchi et al. |
| 2015/0252125 A1 | 9/2015 | Moro et al. |

FOREIGN PATENT DOCUMENTS

| | | |
|---|---|---|
| CN | 105278239 A | 1/2016 |
| CN | 105297446 A | 2/2016 |
| EP | 0733637 A1 | 9/1996 |
| JP | S51-137798 A | 11/1976 |
| JP | H08208993 A | 8/1996 |
| JP | H1180315 A | 3/1999 |
| JP | H11080169 A | 3/1999 |
| JP | H11158232 A | 6/1999 |
| JP | 2000169482 A | 6/2000 |

(Continued)

OTHER PUBLICATIONS

Machine assisted English translation of CN105278239A obtained from https://worldwide.espacenet.com/patent on May 4, 2023, 9 pages.
Machine assisted English translation of CN105297446A obtained from https://worldwide.espacenet.com/patent on May 4, 2023, 15 pages.
International Search Report for PCT/US2019/068025 dated Mar. 13, 2020, 4 pages.
Scheim, U., et al. "Zur synthese von siloxanen: III. Induktive substituetenkonstanten für siloxyreste; 29Si-NMR-spektroskopische untersuchungen." Journal of Organometallic Chemistry 312.1 (1986): 27-31.

(Continued)

*Primary Examiner* — Taylor V Oh
(74) *Attorney, Agent, or Firm* — Warner Norcross + Judd LLP

(57) ABSTRACT

A method of preparing an organosilanol compound is disclosed. The method comprises reacting (A) an initial organosilicon compound and (B) water in the presence of (C) a catalyst. The catalyst (C) is selected from: (C1) $[(C_8H_{12}irCl]_2$ [(p-cymene)$RuCl_2]_2$; and (C3) Pd/C. The initial organosilicon compound (A) has the general formula $HO-Si(R)_2-[Si(R)_2O]_a-OSi(R)_2-Y$ and the organosilanol compound has the general formula $HO-Si(R)2-[Si(R)_2O]_a-OSi(R)_2-Y$, where each R is an independently selected hydrocarbyl group; Y comprises a functional moiety selected from alkoxysilyl moieties, epoxide moieties, and acryloxy moieties, with the proviso that Y is other than the acryloxy moieties when the catalyst (C) is (C3) Pd/C; and subscript a is 0 or 1. The organosilanol compound prepared by the method is also provided.

10 Claims, No Drawings

(56) References Cited

FOREIGN PATENT DOCUMENTS

| | | |
|---|---|---|
| JP | 2000212190 A | 8/2000 |
| JP | 2002128790 A | 5/2002 |
| JP | 2006002035 A | 1/2006 |
| JP | 2008070761 A | 3/2008 |
| JP | 2012121950 A | 6/2012 |
| JP | 2013185066 A | 9/2013 |
| JP | 2016150906 A | 8/2016 |
| JP | 2018070683 A | 5/2018 |
| RU | 2277106 C1 | 5/2006 |
| WO | 2008088523 A1 | 7/2008 |
| WO | 2012046863 A1 | 4/2012 |
| WO | 2017100106 A1 | 6/2017 |
| WO | 2018004797 A1 | 1/2018 |

OTHER PUBLICATIONS

Popowski, Von E., N. Holst, and H. Kelling. "Darstellung und IR-spektroskopische Untersuchungen von Siloxysilanolen." Zeitschrift für anorganische und allgemeine Chemie 494.1 (1982): 166-178.

Cai, Lu, et al. "Synthesis of novel polymethacrylates with siloxyl bridging perfluoroalkyl side-chains for hydrophobic application on cotton fabrics." Applied Surface Science 371 (2016): 453-467.

Lee, Youngjun, et al. "Highly efficient iridium-catalyzed oxidation of organosilanes to silanols." The Journal of organic chemistry 69.5 (2004): 1741-1743.

Li, Yuning, and Yusuke Kawakami. "Catalytic cross-dehydrocoupling polymerization of 1, 4-bis (dimethylsilyl) benzene with water. A new approach to poly [(oxydimethylsilylene)(1, 4-phenylene)(dimethylsilylene)]." Macromolecules 32.10 (1999): 3540-3542.

Teo, Alan Kay Liang, and Wai Yip Fan. "Catalytic hydrogen evolution from hydrolytic oxidation of organosilanes with silver nitrate catalyst." RSC advances 4.71 (2014): 37645-37648.

Seino, Makoto, Ichiro Imae, and Yusuke Kawakami. "Catalytic cross-dehydrocoupling polymerization of phenylsilane with water. A new approach to poly (phenylsilsesquioxane)." Polymer journal 35.2 (2003): 197-202.

Tan, Sze Tat, Jun Wei Kee, and Wai Yip Fan. "Catalytic hydrogen generation from the hydrolysis of silanes by ruthenium complexes." Organometallics 30.15 (2011): 4008-4013.

Lickiss, Paul D. "The synthesis and structure of organosilanols." Advances in Inorganic Chemistry 42 (1995): 147-262.

Lee, Myunghee, Sangwon Ko, and Sukbok Chang. "Highly selective and practical hydrolytic oxidation of organosilanes to silanols catalyzed by a ruthenium complex." Journal of the American Chemical Society 122.48 (2000): 12011-12012.

Yu, Mengmeng, Huize Jing, and Xuefeng Fu. "Highly efficient generation of hydrogen from the hydrolysis of silanes catalyzed by [RhCl(CO)2]2." Inorganic chemistry 52.19 (2013): 10741-10743.

Database Caplus [Online] Chemical Abstracts Services, Columbus, Ohio, US; 1960, XP002798068, retrieved from STN Database Accession No. 1960:6433, 1 page.

Database Caplus [Online] Chemical Abstracts Services, Columbus, Ohio, US; 1982, XP002798069, retrieved from STN Database Accession No. 1982:181341, 1 page.

Database Caplus [Online] Chemical Abstracts Services, Columbus, Ohio, US; 1973, XP002798070, retrieved from STN Database Accession No. 1973:492376, 4 pages.

Database Caplus [Online] Chemical Abstracts Services, Columbus, Ohio, US; 2000, XP002798071, retrieved from STN Database Accession No. 2000:842144, 2 pages.

Database Caplus [Online] Chemical Abstracts Services, Columbus, Ohio, US; 2004, XP002798072, retrieved from STN Database Accession No. 2004:37123, 1 page.

Database Caplus [Online] Chemical Abstracts Services, Columbus, Ohio, US; 2016, XP002798073, retrieved from STN Database Accession No. 2016:1372030, 2 pages.

Machine assisted English translation of JPH1180315A obtained from https://patents.google.com/patent on Sep. 28, 2021, 8 pages.

Machine assisted English translation of JPH11158232A obtained from https://patents.google.com/patent on Sep. 28, 2021, 10 pages.

Machine assisted English translation of RU2277106C1 obtained from https://patents.google.com/patent on Sep. 28, 2021, 8 pages.

Machine assisted English translation of JP2013185066A obtained from https://patents.google.com/patent on Sep. 28, 2021, 10 pages.

Machine assisted English translation of JP2012121950A obtained from https://patents.google.com/patent on Sep. 28, 10 pages.

Machine assisted English translation of JP2008070761A obtained from https://patents.google.com/patent on Sep. 28, 2021, 11 pages.

Chang, Zhixiang et al., "Stepwise synthesis of siloxane chains", ChemComm, 2003.

Barton, Thomas J. et al., "Comments on the Formation of Silanones in the Thermolysis of Hydridosilyl Peroxides", Organometallics 1982, 1, 721-725.

Machine assisted English translation of JP2000169482A obtained from https://worldwide.espacenet. com/patent on Jan. 4, 2024, 10 pages.

Machine assisted English translation of JP2016150906A obtained from https://worldwide.espacenet.com/patent on Jan. 4, 2024, 15 pages.

Izvestiya Akademii Nauk SSSR, Seriya Khimicheskaya, 1959, pp. 1041-1048.

Chemical Communications (Cambridge, United Kingdom), 2004, (2), pp. 206-207.

Russian Journal of General Chemistry, 2007, 77(1), pp. 55-61.

Chemistry—A European Journal, 2012, 18(32), pp. 9789-9792, Supporting Information S5-6.

Khananashvili, Lotari M. et al., Synthesis of Epoxycontaining Siliconorganic Compounds, International Journal of Polymeric Materials, 1995, 28(1-4), pp. 43-49.

Machine assisted English translation of JPH1180169A obtained from https://worldwide.espacenet.com/patent on Jan. 22, 2024, 12 pages.

Machine assisted English translation of JPS51137798A obtained from https://worldwide.espacenet.com/patent on Jan. 22, 2024, 5 pages.

Machine assisted English translation of JPH08208993A obtained from https://worldwide.espacenet.com/patent on Jan. 22, 2024, 7 pages.

Machine assisted English translation of JP2018070683A obtained from https://worldwide.espacenet.com/patent on Jan. 22, 2024, 26 pages.

Machine assisted English translation of JP2006002035A obtained from https://worldwide.espacenet.com/patent on Jan. 22, 2024, 19 pages.

METHOD OF PREPARING FUNCTIONAL ORGANOSILANOL COMPOUNDS

CROSS-REFERENCE TO RELATED APPLICATIONS

This application is the National Stage of International Appl. No. PCT/US2019/068025 filed on 20 Dec. 2019, which claims priority to and all advantages of U.S. Provisional Patent Application No. 62/786,885 filed on 31 Dec. 2018, the content of which is incorporated herein by reference.

FIELD OF THE INVENTION

The present invention generally relates to organosilicon compounds and, more specifically, to a method of preparing organosilanol compounds and organosilanol compounds prepared thereby.

DESCRIPTION OF THE RELATED ART

Organosilicon materials are known in the art and are utilized in myriad end use applications and environments. For example, organopolysiloxanes thereby prepared are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials. However, many methods of preparing hybrid materials require functional organosilicon compounds, which are often difficult to synthesize and/or utilize. In particular, traditional methods of preparing certain functional organosilicon compounds are often incompatible with many silicone materials (e.g. via promoting silicone rearrangements, unselective reactions, degradation, hydrolysis of functional groups, etc.), resulting in decreased yields and purities, and limiting general applicability of such methods.

BRIEF SUMMARY OF THE INVENTION

A method of preparing an organosilanol compound is provided. The method comprises reacting (A) an initial organosilicon compound and (B) water in the presence of (C) a catalyst. The catalyst (C) is selected from: (C1) [(C$_8$H$_{12}$)IrCl]$_2$; (C2) [(p-cymene)RuCl$_2$]$_2$; and (C3) Pd/C. The initial organosilicon compound (A) has the general formula:

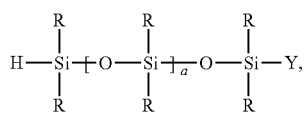

and the organosilanol compound has the general formula:

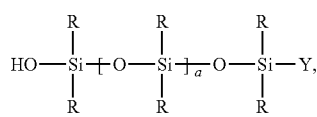

where each R is an independently selected hydrocarbyl group; Y comprises a functional moiety selected from alkoxysilyl moieties, epoxide moieties, and acryloxy moieties, with the proviso that Y is other than the acryloxy moieties when the catalyst (C) is (C3) Pd/C; and subscript a is 0 or 1.

An organosilanol compound prepared by the method is also provided.

DETAILED DESCRIPTION OF THE INVENTION

A method of preparing an organosilanol compound is disclosed. The organosilanol compound prepared may be utilized in diverse end use applications. For example, the organosilanol compound may be utilized as a starting component when preparing silicone-organic hybrid materials, e.g. via copolymerization, grafting, etc.

The method comprises reacting (A) an initial organosilicon compound and (B) water in the presence of (C) a catalyst. The catalyst (C) is selected from: (C1) [(C$_8$H$_{12}$)IrCl]$_2$; (C2) [(p-cymene)RuCl$_2$]$_2$; and (C3) Pd/C, as will be described in further detail below. In general, reacting the initial organosilicon compound (A) and water (B) comprises combining the initial organosilicon compound (A) and water (B) in the presence of the catalyst (C). Said differently, there is generally no proactive step required for the reaction reduction beyond combining the initial organosilicon compound (A) and water (B) in the presence of the catalyst (C). As will be appreciated by those of skill in the art, the reaction may be defined or otherwise characterized as a hydrolysis reaction, e.g. a selective hydrolysis reaction, a catalytic hydrolysis reaction, a hydrolytic conversion reaction, etc.

The initial organosilicon compound (A) has the following formula (I):

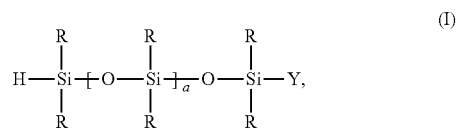

where each R is an independently selected hydrocarbyl group; Y comprises a functional moiety selected from alkoxysilyl moieties, epoxide moieties, and acryloxy moieties, with the proviso that Y is other than the acryloxy moieties when the catalyst (C) is (C3) Pd/C; and subscript a is 0 or 1.

Each R is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R includes one or more heteroatoms (oxygen, sulfur, nitrogen, etc.) within the chain, or both. As such, it will be appreciated that R includes hydrocarbon moieties that may have substituents in and/or on (i.e., appended to and/or integral with) carbon chains/backbones thereof, such that R may comprise or be an ether, etc.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

Each R may be the same or different from any other R in the initial organosilicon compound (A). In certain embodiments, each R is the same. In other embodiments, at least one R is different than at least one other R of the initial organosilicon compound (A). Typically, each R is independently selected from alkyl groups, such as methyl groups, ethyl groups, etc. In certain embodiments, each R is methyl.

Subscript a is 0 or 1. As such, in certain embodiments, subscript a is 0 and the initial organosilicon compound (A) has the general formula:

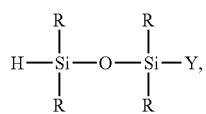

where each R and Y are as defined herein. In other embodiments, subscript a is 1 and the initial organosilicon compound (A) has the general formula:

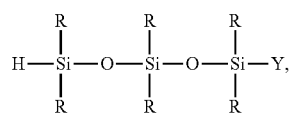

where each R and Y are as defined herein.

Those of skill in the art will readily understand that the initial organosilicon compound (A) may be defined as a disiloxane when subscript a is 0, and as a trisiloxane when subscript a is 1. Likewise, the moiety of formula —Si(R)$_2$—[Si(R)$_2$O]$_a$—OSi(R)$_2$— may be referred to as the "siloxane backbone" of the initial organosilicon compound (A).

Subject to the provisos described herein, Y generally comprises a functional moiety selected from alkoxysilyl moieties, epoxide moieties, and acryloxy moieties. Said differently, the functional moiety Y comprises at least one alkoxysilyl, epoxide, or acryloxy substituent, as described in further detail below. The alkoxysilyl, epoxide, or acryloxy substituent of the functional moiety Y may be bonded directly (e.g. via covalent bond) or indirectly (e.g. via divalent linking group) to the siloxane backbone of the initial organosilicon compound (A). In certain embodiments, the alkoxysilyl, epoxide, or acryloxy substituent of the functional moiety Y is bonded directly to the siloxane backbone of the initial organosilicon compound (A), such that Y itself represents an alkoxysilyl, epoxide, or acryloxy group, as described below.

In some embodiments, the functional moiety Y has the formula -D-R$^1$, where D is a divalent linking group and R$^1$ comprises an alkoxysilyl group, an acryloxy group, or an epoxide group.

In general, D is a divalent linking group, and may be linear or branched and substituted or unsubstituted. Typically, D is selected from divalent substituted or unsubstituted hydrocarbon groups. For example, in some embodiments, D comprises a hydrocarbon moiety having the formula —(CH$_2$)$_m$—, where subscript m is from 1 to 16, alternatively from 1 to 6. In these or other embodiments, D may comprise a substituted hydrocarbon, i.e., a hydrocarbon group comprising a backbone having at least one heteroatom (e.g. O, N, S, etc.). For example, in some embodiments, D is a hydrocarbon having a backbone comprising an ether moiety. In certain embodiments, the initial organosilicon compound (A) comprises a mixture of compounds of the general formula above, which differ from one another with respect to the divalent group D. In some such embodiments, each D is linear or branched hydrocarbon group, and the initial organosilicon compound (A) comprises a ratio of compounds having linear or branched group D of 50:50, alternatively of 65:35, alternatively of >90:10, alternatively of >95:5 (linear:branched). In certain embodiments, each D is a linear hydrocarbon group in at least 70, alternatively at least 75, alternatively at least 80, alternatively at least 85, alternatively at least 90, alternatively at least 95, mol % of molecules utilized having the general formula above.

In general, R$^1$ is independently selected from alkoxysilyl groups, acryloxy groups, and epoxide groups. These groups are not particularly limited, and are exemplified by the general and specific examples below. As such, alternative alkoxysilyl groups, acryloxy groups, and/or epoxide groups will be readily envisaged by one of skill in the art in view of the description herein.

In certain embodiments, R$^1$ is an alkoxysilyl group of the formula:

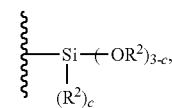

where each R$^2$ is an independently selected hydrocarbyl group; and subscript c is 0, 1, or 2. In such embodiments, each $R^2$ may be the same or different from any other $R^2$ in the alkoxysilyl group. Examples of hydrocarbyl groups suitable for $R^2$ include those described with respect to R above. Typically, each $R^2$ is independently selected from alkyl groups, such as methyl groups, ethyl groups, etc. In certain embodiments, each $R^2$ is methyl.

Subscript c is 0, 1, or 2, such that the alkoxysilyl group may be defined as a tri alkoxysilyl, dialkoxyalkylsilyl, or alkoxyldialkylsilyl group, respectively. Typically, subscript c is 0 or 1, such that the alkoxysilyl group comprises at least two alkoxy groups. In specific embodiments, subscript c is 0 and each $R^2$ is methyl, such that $R^1$ is a trimethoxysilyl group (e.g. is of formula —$Si(OCH_3)_3$).

In some embodiments, $R^1$ is an epoxide group. The epoxide group is not particular limited, and may be any group comprising an epoxide (e.g. a two carbon three-atom cyclic ether). For example, $R^1$ may be a cyclic epoxide or a linear epoxide. As understood by those of skill in the art, epoxides (e.g. epoxide groups) are generally described in terms of the carbon skeleton the two epoxide carbons compose (e.g. the epoxyalkane derived from epoxidation of an alkene). For example, linear epoxides generally comprise a linear hydrocarbon comprising two adjacent carbon atoms bonded to the same oxygen atom. Similarly, cyclic epoxides generally comprise cyclic hydrocarbon comprising two adjacent carbon atoms bonded to the same oxygen atom, where at least one, but typically both, adjacent carbon atom is in the ring of the cyclic structure (i.e., is part of both the epoxide ring and the hydrocarbon ring). The epoxide may be a terminal epoxide or an internal epoxide. Specific examples of suitable epoxides include epoxyalkyl groups, such as epoxyethyl groups, epoxypropyl groups, epoxyhexyl groups, etc., epoxycycloalkyl groups, such as epoxycyclopentyl groups, epoxycyclohexyl groups, etc., and the like. One of skill in the art will appreciate that such epoxide groups may be substituted or unsubstituted.

In certain embodiments, $R^1$ is an epoxyethyl group of the following formula:

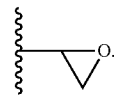

In other embodiments, $R^1$ is an epoxycyclohexyl group of the following formula:

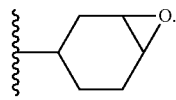

When $R^1$ is an epoxide group, Y may be a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group.

In particular embodiments, $R^1$ is an acryloxy group of the formula:

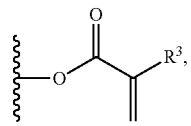

where $R^3$ independently selected from hydrocarbyl groups and H. Examples of hydrocarbyl groups suitable for $R^3$ include those described with respect to R above.

In certain embodiments, $R^3$ is H, such that $R^1$ may be defined as an acrylate group. In other embodiments, $R^3$ is selected from substituted or unsubstituted hydrocarbyl groups, such as any of those described above with respect to R. In some such embodiments, $R^3$ is an alkyl group, such that $R^1$ may be defined as an alkylacrylate group. In specific embodiments, $R^3$ is methyl, such that $R^1$ may be defined as a methacrylate group.

In particular embodiments, Y comprises, alternatively is, an alkyl glycidyl ether group, such as a methyl glycidyl ether group, ethyl glycidyl ether group, propyl glycidyl ether group, etc. In some embodiments, Y comprises, alternatively is, an epoxycyclohexylalkyl group, such as an epoxycyclohexylmethyl group, an epoxycyclohexylethyl group, an epoxycyclohexylpropyl group, etc. In certain embodiments, Y comprises, alternatively is, an alkoxysilylalkyl group, such as a trimethoxysilylmethyl group, a trimethoxysilylethyl group, a diethoxymethylsilylbutyl group, etc.

The initial organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc.), a silicone fluid, or combinations thereof. Typically, the method is carried out in the presence of a carrier vehicle or solvent comprising a polar component, such as an ether, acetonitrile, dimethylformamide, dimethylsulfoxide, and the like, or combinations thereof. In particular embodiments, the carrier vehicle comprises a halogenated hydrocarbon, such as those described above. In such embodiments, the carrier vehicle in general, and/or the halogenated hydrocarbon in particular, is typically purified and/or processes to reduce, alternatively to remove, any hydrochloric acid (HCl) therefrom. It will be appreciated that the initial organosilicon compound (A) may be combined with the carrier vehicle prior to, during, or after being combined with components (B) and (C).

In some embodiments, the method is carried out in the absence of carrier vehicles/volatiles that are reactive with the initial organosilicon compound (A) and/or the catalyst (C). For example, in certain embodiments, the method may comprise stripping a mixture of the initial organosilicon compound (A) of volatiles and/or solvents (e.g. water, reactive solvents, etc.). Techniques for stripping the initial organosilicon compound (A) are known in the art, and may include heating, drying, applying reduced pressure/vacuum, azeotroping with solvents, utilizing molecular sieves, etc., and combinations thereof.

The initial organosilicon compound (A) may be utilized in any amount, which will be selected by one of skill in the art, e.g. dependent upon the particular catalyst (C) selected, the reaction parameters employed, the scale of the reaction (e.g. total amounts of component (A) to be converted and/or organosilanol compound to be prepared), etc.

The water (B) is not generally limited, and may be utilized neat (i.e., absent any carrier vehicles/solvents), pure (i.e., free from or substantially free from minerals and/or other impurities), etc. For example, the water (B) may be processed or unprocessed prior to the reaction with component (A). Examples of processes that may be used include distilling, filtering, deionizing, purifying, etc., and combinations thereof, such that the water (B) may be deionized, distilled, purified, etc. In certain embodiments, the water (B) is unprocessed (e.g. may be tap water, i.e., provided by a municipal water system). In some embodiments, the water (B) is purified prior to the reaction with component (A). In particular embodiments, the water (B) is utilized as a mixture (e.g. solution, suspension, etc.) comprising a carrier vehicle/solvent, such as any of those listed above with respect to the initial organosilicon compound (A).

The water (B) may be utilized in any amount, which will be selected by one of skill in the art, e.g. dependent upon the particular catalyst (C) selected, the reaction parameters employed, the scale of the reaction (e.g. total amount of component (A) to be converted and/or organosilanol compound to be prepared), etc.

The relative amounts of the initial organosilicon compound (A) and water (B) utilized may vary, e.g. based upon the particular initial organosilicon compound (A) selected, the particular catalyst (C) selected, the reaction parameters employed, etc. As understood by those of skill in the art, the hydrolysis of the initial organosilicon compound (A) with water (B) occurs at a theoretical maximum molar ratio of 1:1 (A):(B). However, an excess of the one of the components is typically utilized to fully consume one of compounds (A) or (B), e.g. to simplify purification of the reaction product formed. For example, in certain embodiments, water (B) is utilized in relative excess to maximize a conversion rate of the initial organosilicon compound (A) to the organosilanol compound.

In certain embodiments, the initial organosilicon compound (A) and water (B) are reacted in a molar ratio of from 10:1 to 1:10 (A):(B). For example, in certain embodiments, the initial organosilicon compound (A) and water (B) are reacted in a molar ratio of from 1:1 to 1:9, such as from 1:1 to 1:7, alternatively of from 1:1 to 1:5, alternatively of from 1:1 to 1:4, alternatively of from 1:1 to 1:3.5, alternatively of from 1:1.1 to 1:3.5, alternatively of from 1:1.15 to 1:3.5, (A):(B). It will be appreciated that ratios outside of these ranges may be utilized as well. For example, in certain embodiments, water (B) is utilized in a gross excess (e.g. in an amount of 10, alternatively 15, alternatively 20, times the molar amount of the initial organosilicon compound (A)), such as when water (B) is utilized as a carrier (i.e., a solvent, diluent, etc.) during the reaction.

As introduced above, the catalyst (C) is selected from (C1) $[(C_8H_{12})IrCl]_2$, (C2) $[(p\text{-cymene})RuCl_2]_2$, and (C3) Pd/C. The particular catalyst (C) utilized is a function of the particular component (A) to be hydrolyzed. In particular, the selection of the functional moiety Y will control which of catalysts (C) may be utilized. In general, the use of catalysts (C1) and (C2) $[(C_8H_{12})IrCl]_2$ not limited, and may be utilized with any of the initial organosilicon compounds (A) described above. As such, in certain embodiments, the catalyst (C1) is utilized, such that the catalyst (C) is $[(C_8H_{12})IrCl]_2$. In other embodiments, the catalyst (C2) is utilized, such that the catalyst (C) is $[(p\text{-cymene})RuCl_2]_2$.

Catalyst (C3) Pd/C may be utilized then the functional moiety Y of the initial organosilicon compound (A) is other than the acryloxy moieties. As such, catalyst (C3) may be generally selected for use when the initial organosilicon compound (A) is an alkoxysilyl or epoxide functional organosilicon compound. As such, in certain embodiments, the initial organosilicon compound (A) is an alkoxysilyl or epoxide functional organosilicon compound and the catalyst (C3) is utilized, such that the catalyst (C) is Pd/C.

Methods of preparing catalysts (C1), (C2), and (C3) are well known in the art, with the catalysts and/or compounds used to prepare the same being commercially available from various suppliers. As such, the catalyst (C) may be prepared as part of the method, or otherwise obtained (i.e., as a prepared compound). Preparations of the catalyst (C) may be formed prior to the reaction of components (A) and (B), or in situ (i.e., during the reaction of components (A) and (B)).

The catalyst (C) may be utilized in any form, such as neat (i.e., absent solvents, carrier vehicles, diluents, etc.), or disposed in a carrier vehicle, such as a solvent or dispersant (e.g. such as any of those listed above with respect to the initial organosilicon compound (A)). In some embodiments, the catalyst (C) is utilized in a form absent water and/or carrier vehicles/volatiles reactive with the initial organosilicon compound (A) and/or the catalyst (C) itself (i.e., until combined with components (A) and (B). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected, the reaction parameters employed, the scale of the reaction (e.g. total amounts of components (A) and (B)), etc. The molar ratio of the catalyst (C) to components (A) and/or (B) utilized in the reaction may influence the rate and/or amount of hydrolysis to prepare the organosilanol compound. Thus, the amount of the catalyst (C) as compared to components (A) and/or (B), as well as the molar ratios therebetween, may vary. Typically, these relative amounts and the molar ratio are selected to maximize the hydrolysis of component (A) to the organosilanol compound, while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.001 to 10 mol % based on the total amount of component (A) utilized. For example, the catalyst (C) may be used in an amount of from 0.005 to 10, alternatively of from 0.005 to 5, alternatively of from 0.01 to 5, mol % based on the total amount of component (A) utilized.

In some embodiments, e.g. where the initial organosilicon compound (A) is acryloxy functional, the reaction inhibitor (D) comprises, alternatively is, a polymerization inhibitor. Examples of polymerization inhibitors include radical scavengers, antioxidants, light stabilizers, UV-absorbers, and the like, as well as a combination thereof. Such compounds are known in the art, and generally are, or include, a chemical compound or moiety capable of interacting with a free radical to render the free radical inactive, e.g. via elimination the free radical through the formation of a covalent bond therewith. The polymerization inhibitor may also, or alternatively, be a polymerization retardant, i.e., a compound that reduces the rate of initiation and/or propagation of a radical polymerization. For example, in some embodiments, the polymerization inhibitor comprises, alternatively is, oxygen gas. In general, the polymerization inhibitor is utilized to prevent and/or suppress the formation of byproducts that may be formed via radical polymerization of the initial organosilicon compound (A) and/or the organosilanol compound. General examples of polymerization inhibitors include phenolic compounds, quinone and/or hydroquinone compounds, N-oxyl compounds, phenothiazine compounds, hindered amine compounds, and combinations thereof. In specific embodiments, the reaction inhibitor is selected from amines, such as ethylenediaminetetraacetic acid; aromatic amines, such as N,N'-p-phenylenediamine, N,N'-di-β-naphthyl-p-phenylenediamine, and phenothiazine; quinines; hydroquinones, such as hydroquinone monomethyl ether; sterically hindered phenols, such as 2,6-di-tertbutylphenol, 2,6-di-tert-butyl-4-methylphenol, 2,6-di-tert-butyl-4-(N,N-dimethylamino)methylphenol, and butylated hydroxytoluene; stable free radicals; and combinations thereof. In particular embodiments, the reaction inhibitor (D) comprises, alternatively is, (2,2,6,6-tetramethylpiperidin-1-yl)oxyl (TEMPO), 4-hydroxy (2,2,6,6-tetramethylpiperidin-1-yl) oxyl (4HT), bis(2,2,6,6-tetramethylpiperidin-1-yl)oxyl sebacate (Bis-TEMPO), polymer-bound TEMPO, or a combination thereof.

When utilized, the reaction inhibitor (D) may be added to the reaction as a discrete component, or may be combined with another component (e.g. component (A)) prior to the reaction of components (A) and (B). The reaction inhibitor (D) may be utilized in any amount, which will be selected by one of skill in the art, e.g. dependent upon the particular reaction inhibitor (D) selected, the reaction parameters employed, the scale of the reaction (e.g. total amounts of components (A) and/or (B)), the atmosphere of the reaction, the temperature and/or pressure of the reaction, etc.). In certain embodiments, the reaction inhibitor (D) is present in the reaction in an amount of from 50 to 2000 ppm, such as in an amount of about 50, alternatively of about 100, alternatively of about 250, alternatively of about 500, alternatively of about 1000, alternatively of about 1500, alternatively of about 2000 ppm. However, one of skill in the art will readily appreciate that amounts outside of these ranges and exemplary amounts may also be utilized, e.g. where the reaction scale and/or conditions requires additional amounts of the reaction inhibitor (D). The reaction inhibitor (D) may be utilized in the method at any time, include before, during, and after the reaction of components (A) and (B). Additionally, the reaction inhibitor (D) may be utilized peripherally during the method, e.g. in vacuum traps, distillation and/or receiving pots, etc., in addition to use within the reaction itself.

Typically, the reaction of components (A) and (B) to prepare the organosilanol compound is carried out in a vessel or reactor. When the reaction is carried out at an elevated or reduced temperature as described below, the vessel or reactor may be heated or cooled in any suitable manner, e.g. via a jacket, mantle, exchanger, bath, coils, etc.

Components (A), (B), and (C), and optionally (D), may be fed together or separately to the vessel, or may be disposed in the vessel in any order of addition, and in any combination. For example, in certain embodiments, components (B) and (C) are added to a vessel containing component (A), and optionally component (D). In such embodiments, components (B) and (C) may be first combined prior to the addition, or may be added to the vessel sequentially (e.g. (C) then (B)). In general, reference to the "reaction mixture" herein refers generally to a mixture comprising components (A), (B), and (C) (e.g. as obtained by combining such components, as described above). Of course, when utilized, component (D) may also be includes in the reaction mixture.

The method may further comprise agitating the reaction mixture. The agitating may enhance mixing and contacting together components (A), (B), and (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., hydrolysis), of the initial organosilicon compound (A) with the water (B) to form the organosilanol compound. Other conditions may be result-effective conditions for enhancing reaction yield or minimizing amount of a particular reaction by-product included within the reaction product along with the organosilanol compound.

In certain embodiments, the reaction of components (A) and (B) is carried out in the presence of a carrier vehicle or solvent, such as one or more of those described above. For example, portions of carrier vehicle or solvent may be added to or otherwise combined with the initial organosilicon compound (A), water (B), the catalyst (C), and/or the reaction inhibitor (D) (i.e., when present) discretely, collectively with mixtures of components (A), (B), (C), and/or (D), or with the reaction mixture as a whole. The total amount of carrier vehicle/solvent present in the reaction mixture will be selected by one of skill in the art, e.g. based on the particular component (A) selected, the particular catalyst (C) selected, the reaction parameters employed, etc.).

In some embodiments, the reaction is carried out at a reduced temperature. The reduced temperature will be selected and controlled depending on the particular organosilicon compound (A) selected, the particular catalyst (C) selected, the particular organosilanol compound being prepared, and combinations thereof. Accordingly, the reduced temperature will be readily selected by one of skill in the art in view of the reaction conditions and parameters selected and the description herein. The reduced temperature is typically from −78° C. to less than ambient temperature, such as from −30 to 25, alternatively from −15 to 25, alternatively from −10 to 25, alternatively from −10 to 20, alternatively from −5 to 20° C. In some embodiments, the reaction is carried out at a temperature of about 0° C. (e.g. by use of a circulator or chiller using ice and/or a set point of 0° C.). In some embodiments, the reaction is carried out at room temperature (i.e., from 20 to 25° C.).

It is to be appreciated that the reaction temperature may also differ from the ranges set forth above. Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time during which the reaction of components (A) and (B) to prepare the organosilanol compound is carried out is a function of scale, reaction parameters and conditions, selection of particular components, etc. In certain embodiments, the time during which the reaction is carried out is from greater than 0 to 48 hours, such as from 1 minute to 48 hours. On a relatively large scale (e.g. greater than 1, alternatively 5, alternatively 10, alternatively 50, alternatively 100 kg), the reaction may be carried out for hours, such as from 1 to 48, alternatively from 2 to 36, alternatively from 4 to 24, alternatively of 6, 12, 18, 24, 36, or 48 hours, as will be readily determined by one of skill in the art (e.g. by monitoring conversion of the initial organosilicon compound (A), production of the organosilanol compound, etc., such as via chromatographic and/or spectroscopic methods). On a relatively small scale (e.g. gram-scale, or less than 10, alternatively 5, alternatively 1, kg), the reaction may be carried out for a time of from 1 minute to 4 hours, such as from 1 minute to 1 hour, from 5 to 30 minutes, or for a time of 10, 15, or 20 minutes.

Generally, the reaction of components (A) and (B) prepares a reaction product comprising the organosilanol compound. In particular, over the course of the reaction, the reaction mixture comprising components (A), (B), (C), and (D) (when present) comprises increasing amounts of the organosilanol compound and decreasing amounts of components (A) and (B). Once the reaction is complete (e.g. one of components (A) or (B) is consumed, no additional organosilanol compound is being prepared, etc.), the reaction mixture may be referred to as a reaction product comprising the organosilanol compound. In this fashion, the reaction product typically includes any remaining amounts of components (A), (B), (C), and (D) (when present), as well as degradation and/or reaction products thereof (e.g. materials which were not previously removed via any distillation, stripping, etc.). If the reaction is carried out in any carrier vehicle or solvent, the reaction product may also include such carrier vehicle or solvent.

In certain embodiments, the method further comprises isolating and/or purifying the organosilanol compound from the reaction product. As used herein, isolating the organosilanol compound is typically defined as increasing the relative concentration of the organosilanol compound as compared to other compounds in combination therewith (e.g. in the reaction product or a purified version thereof). As such, as is understood in the art, isolating/purifying may comprise removing the other compounds from such a combination (i.e., decreasing the amount of impurities combined with the organosilanol compound, e.g. in the reaction product) and/or removing the organosilanol compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the organosilanol compound. It is to be appreciated that isolating may include, and thus may be referred to as, purifying the organosilanol compound. However, purifying the organosilanol compound may comprise alternative and/or additional techniques as compared to those utilized in isolating the organosilanol compound. Regardless of the particular technique(s) selected, isolation and/or purification of organosilanol compound may be performed in sequence (i.e., in line) with the reaction itself, and thus may be automated. In other instances, purification may be a standalone procedure to which the reaction product comprising the organosilanol compound is subjected.

In particular embodiments, isolating the organosilanol compound comprises distilling and/or stripping volatiles from the reaction product. For example, in certain embodiments, such as where a carrier vehicle is utilized, volatiles are distilled and/or stripped from the reaction mixture comprising the organosilanol compound. In these or other embodiments, isolating the organosilanol compound comprises filtering the reaction product to remove remaining amounts of the catalyst (C) and/or solids formed therefrom. In both or either case (e.g. after removing volatiles and/or solids via stripping/distillation and/or filtration), the reaction product may be referred to as the isolated organosilanol compound.

In particular embodiments, the method further comprises purifying the organosilanol compound. Any suitable technique for purification may be utilized. In certain embodiments, purifying the organosilanol compound comprises distillation, to either remove the organosilanol compound (e.g. as a distillate) or to strip other compounds/components therefrom (i.e., leaving the organosilanol compound in the pot as a high-boiling component of the reaction mixture or purified reaction mixture. As will be appreciated by those of skill in the art, distilling the reaction product or purified reaction product to purify and/or isolation the organosilanol compound is typically carried out at an elevated temperature and a reduced pressure. The elevated temperature and reduced pressure are independently selected, e.g. based on the particular components of the reaction, the particular organosilanol compound prepared, other isolation/purification techniques utilized, etc., as will be readily determined by those of skill in the art. In some embodiments, purifying the organosilanol compound may be defined as purifying the isolated organosilanol compound (e.g. where purification is performed subsequent to isolation of the organosilanol compound).

The organosilanol compound prepared in accordance with the method has the following general formula:

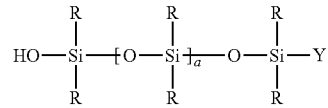

where each R is an independently selected hydrocarbyl group; Y comprises a functional moiety selected from alkoxysilyl moieties, epoxide moieties, and acryloxy moieties. As will be understood by one of skill in the art in view of the description herein, the initial organosilicon compound (A) utilized in the method forms a portion of the organosilanol compound corresponding to the organosilicon moiety represented by the sub-formula —Si(R)$_2$—[Si(R)$_2$O]$_a$—OSi(R)$_2$—Y, i.e., the entire compound to the exclusion of the silicon-bonded hydroxyl group HO—. As such, where formulas, structures, moieties, groups, or other such motifs are shared between the organosilanol compound and the initial organosilicon compound (A), the description above with respect to such shared motifs may equally describe the organosilanol compound (e.g. with respect to each R, subscript a, functional moiety Y, etc.).

For example, in certain embodiments, the organosilanol compound has the following general formula:

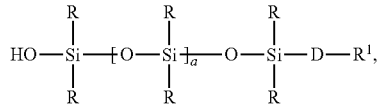

where each R is an independently selected hydrocarbyl group; $R^1$ comprises an alkoxysilyl group, an epoxide group, or an acryloxy group; D is a divalent linking group; and subscript a is 0 or 1, with the proviso that a is 1 when each R is $-CH_3$, $R^1$ is methacryloxy, and D is $-(CH_2)_3-$. In some such embodiments, D comprises a hydrocarbon moiety having the formula $-(CH_2)_m-$, where subscript m is from 1 to 6. In these or other embodiments, D is a hydrocarbon, optionally comprising an ether moiety (e.g. in the backbone thereof).

In some embodiments, $R^1$ is an alkoxysilyl group of the formula:

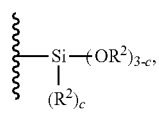

where each $R^2$ is an independently selected hydrocarbyl group; and subscript c is 0, 1, or 2. In certain embodiments, each $R^2$ is methyl. In these or other embodiments, subscript c is 0 or 1. In specific embodiments, subscript c is 0.

In certain embodiments, $R^1$ is a cyclic epoxide or a linear epoxide group. In some such embodiments, $R^1$ is an epoxyethyl group of the following formula:

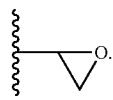

In other embodiments, $R^1$ is an epoxycyclohexyl group of the following formula:

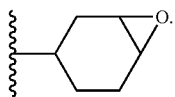

In particular embodiments, $R^1$ is an acryloxy group of the formula:

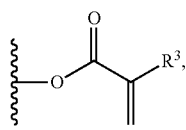

where $R^3$ independently selected from hydrocarbyl groups and H. In some such embodiments, $R^3$ is H. In other such embodiments, $R^3$ is methyl.

With respect to the organosilanol compound as a whole, in certain embodiments, each R is methyl. In these or other embodiments, subscript a is 0. In particular embodiments, Y comprises, alternatively is, an ethyl glycidyl ether group, an epoxycyclohexylethyl group, a trimethoxysilylmethyl group, or a trimethoxysilylethyl group.

A composition comprising the organosilanol compound is also provided. The composition generally includes the organosilanol compound and at least one other components, such as a non-reactive component (e.g. a carrier vehicle, solvent, etc.), a reactive component (e.g. a compound reactive with, or capable of being made reactive with, the organosilanol compound), or combinations thereof. The organosilanol compound, and the composition comprising the same, of this disclosure may be utilized in various end-use applications, as will be readily envisaged by one of skill in the art.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Example 1: IrCODCl Dimer Catalyzed Hydrolysis of AMA Converter

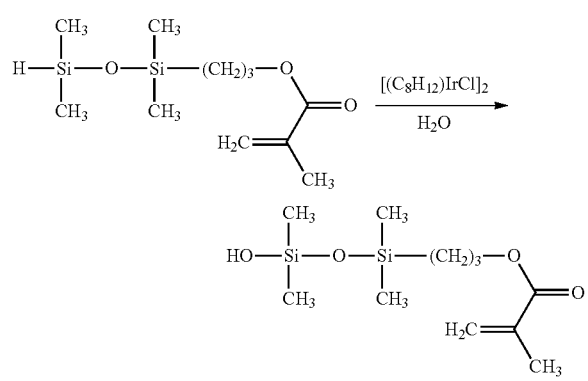

To a 100 mL flask was added 5.0098 g AMA converter, 10 mL of THF and 100₤ of Ir(COD)Cl dimer (0.025 M in toluene). The solution was stirred and then 400₤ DI water (1.15 eq.) was added at room temperature. The reaction was mildly exothermic and vigorous bubbling occurred ($H_2$ release). The reaction was stirred for 15 min and then most of the THF stripped off. $^1$H NMR indicated ~4% reduced (minor) product. The material was then distilled at 74 mTorr and 65° C. Recovered 4.5 g (85%), purity 95%. $^1$H (400 MHz, benzene-$d_6$):major δ 6.15 (m, 1H, CCH$_2$), 5.22 (p, J=1, 1H, CCH$_2$), 4.08 (t, J=8 Hz, 2H, OCH$_2$), 3.17 (br s, 1H, OH), 1.84 (dd, J=1 Hz, J=1 Hz, 3H, CCH$_3$), 1.66 (m, 2H, OCH$_2$CH$_2$), 0.49 (m, 2H, SiCH$_2$), 0.14 (s, 6H, SiCH$_3$), 0.10 (s, 6H, SiCH$_3$). Minor δ 4.04 (t, J=8 Hz, 2H, OCH$_2$), 3.17 (br s, 1H, OH), 2.39 (sept, J=8 Hz, 1H, CH), 1.66 (m, 2H, OCH$_2$CH$_2$), 1.07 (d, J=4 Hz, J=1 Hz, 6H, CH(CH$_3$)$_2$), 0.49 (m, 2H, SiCH$_2$), 0.14 (s, 6H, SiCH$_3$), 0.10 (s, 6H, SiCH$_3$). $^{29}$Si: δ 7.5 ($M^R$), −12.0 ($M^{OH}$).

Example 2: Ir Catalyzed Hydrolysis of ETM Converter

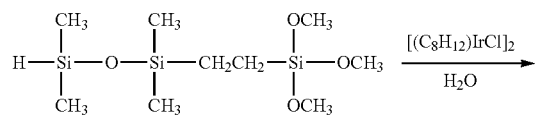

To a 40 mL scintillation vial was added 2.0078 g ETM converter, 4 mL of THF and 40 μL of Ir(COD)Cl dimer (0.025 M in toluene). The solution was stirred and then 400₤ DI water (3.15 eq.) was added at room temperature. The reaction was stirred for 15 min and then most of the THF stripped off. GCMS indicated product present in 85%.

Example 3: Pd Catalyzed Hydrolysis of ETM Converter

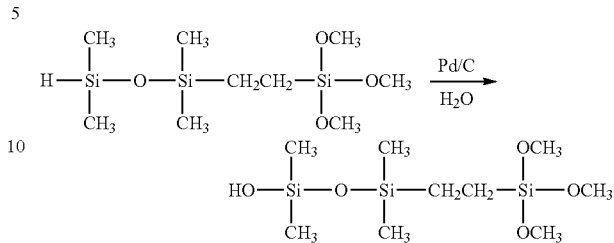

To a 100 mL flask was added 10.00 g ETM converter, 12 mL of THF and 50 mg of Pd/C (10%). The solution was stirred and then 700₤ DI water (1.10 eq.) was added at room temperature. The reaction was stirred for 20 min and then most of the Pd/C was filtered off. The product was then distilled at 74 mTorr and 50° C., providing the major product in 90% yield. $^1$H (400 MHz, benzene-$d_6$): δ 3.47 (m, 9H, OCH$_3$), 0.77 (s, 4H, SiCH$_2$CH$_2$), 0.16 (s, 6H, SiCH$_3$), 0.15 (s, 6H, SiCH$_3$). $^{29}$Si:major δ 8.2 ($M^R$), −12.5 ($M^{OH}$), −41.8 (Si(OMe)$_3$). Minor δ 8.7 ($M^R$), −11.1 (Si(Me)$_2$OMe), −42.1 (Si(OMe)$_2$OH).

Example 4: Pd Catalyzed Hydrolysis of VCMX-Converter

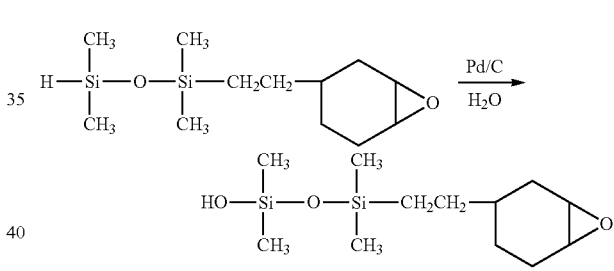

To a 100 mL 3 neck flask was added THF (6.4 mL), VCMX converter (4.96 g, 20 mmol) and Pd/C (5 wt. %, 0.1 mol %, 42 mg, powder). The flask was stirred under nitrogen. Then water (0.47 mL, 26 mmol) was added through a septum over ~5 min. A GCMS was taken at 30 (83% product) and 66 minutes (97% product. After 66 minutes the reaction mixture was filtered through celite and the THF stripped off. 2.52 g was recovered (47%).

Example 5: Pd Catalyzed Hydrolysis of AGE-Converter

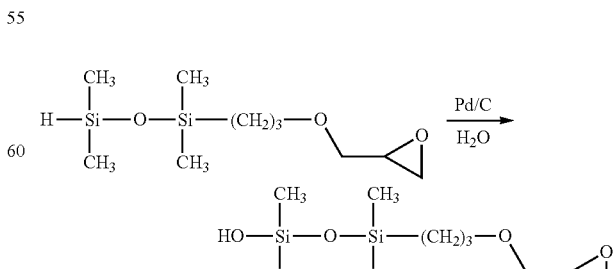

To a 100 mL 3 neck was added THF (6.4 mL), AGE converter (5.16 g, 20 mmol) and Pd/C (5 wt. %, 0.1 mol %, 42 mg, powder). The flask was stirred under nitrogen. Then water (0.47 mL, 26 mmol) was added through a septum over ~5 min. After 150 minutes the reaction mixture was filtered through celite and the solvent stripped off to give 2.65 g of product (48%).

Example 6: Ru(p-Cymene)Cl Dimer Catalyzed Hydrolysis of AMA Converter

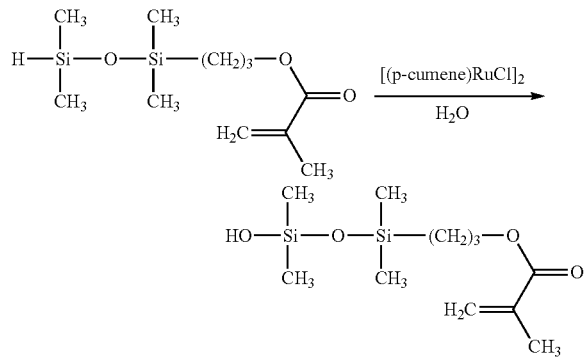

To a 20 mL vial was added 1 g AMA converter, 1 g of THF and 9 mg of Ru(p-cymene)Cl$_2$ dimer (0.19 mol %). The solution was stirred and then 90 μL DI water (1.3 eq.) was added at room temperature. The reaction was stirred for 10 min and then $^1$H NMR sample was taken and indicates ~10% hydrogenated product. After stripping, $^1$H NMR and GC-MS indicated multiple products were present. Product purity is 43%

Example 7: Pd Catalyzed Hydrolysis of ETM Converter

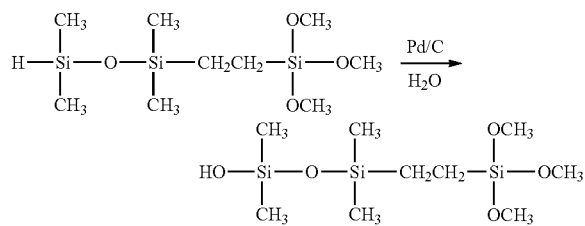

16.92 g of ETM converter (10 mmol) and 16.92 g of THF were mixed in a 2 oz vial (stock solution). A 2 oz vial was then charged with a stir bar, 21 mg Pd/C (5 wt %); and 5.65 g of the stock solution (to 0.1 mol %). Then 0.23 mL of water was added. The vial was then placed in a plastic jar that had a needle connected to a hose protruding from both sides. One hose attached to nitrogen and the other a bubbler. The vial was then stirred for 100 minutes at room temperature. The results of the reaction are set forth in Table 2 further below.

Comparative Example 1: Pd Catalyzed Hydrolysis of AMA Converter

To a 250 mL 2 neck flask was added 200 mg of 10% Pd/C, 75 mL acetone and 10 g of AMA converter. The reaction was then placed in ice under a nitrogen atmosphere and stirred for 1 h. Stirring was continued for an additional 2 h at room temperature. The reaction was then filtered through a plug of celite and the acetone stripped on a high vacuum line at room temperature. $^1$H NMR spectrum indicated 90% reduced product, 10% non-reduced product.

Comparative Examples 2-6: Other Supported Metals for the Hydrolysis of ETM-Converter

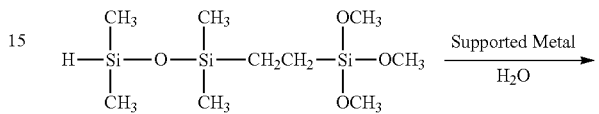

16.92 g of ETM converter (10 mmol) and 16.92 g of THF were mixed in a 2 oz vial (stock solution). To 5×2 oz vials was added a stir bar and the following supported metals (0.1 mol %):

TABLE 1

| Catalyst Loading | | |
|---|---|---|
| | Catalyst | Amount |
| Comparative Example 2 | Ir/C (0.5 wt %) | 384 mg |
| Comparative Example 3 | Pt/C (5 wt. %) | 39 mg |
| Comparative Example 4 | Rh/C (5 wt %) | 21 mg |
| Comparative Example 5 | Ru/C (5 wt %) | 21 mg |
| Comparative Example 6 | PtNPs (1000 ppm) | 1.95 mL |

Then 5.65 g of the stock solution was distributed to each vial. Then 0.23 mL of water was added. The vials were placed in a plastic jar that had a needle connected to a hose protruding from both sides. One hose attached to nitrogen and the other a bubbler. The vials were then stirred for 100 minutes at room temperature.

TABLE 2

| GC results | | | | |
|---|---|---|---|---|
| Catalyst | Time | Starting material | Rearranged | Product |
| PtNPs (1000 ppm) | 100 min | 94 | — | 5 |
| Pt/C (5 wt. %) | 100 min | 86 | 4 | 9 |
| Ru/C (5 wt %) | 100 min | 94 | — | 5 |
| Ru/C (5 wt %) | 16 h | 2.5 | 17.8 | 79.7 |
| Ir/C (0.5 wt %) | 100 min | — | — | — |
| Ir/C (0.5 wt %) | 16 h | — | — | — |
| Rh/C (5 wt %) | 100 min | 77 | 7 | 14 |
| Rh/C (5 wt %) | 16 h | 27 | 40 | 33 |
| Example 7 (Pd/C (5 wt %)) | 100 min | 0 | 10 | 90 |

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

The invention claimed is:

1. A method of preparing an organosilanol compound, said method comprising:
reacting (A) an initial organosilicon compound and (B) water in the presence of (C) a catalyst selected from (C1) $[(C_8H_{12})IrCl]_2$, (C2) $[(p\text{-cymene}) RuCl_2]_2$, and (C3) Pd/C, thereby preparing the organosilanol compound;
wherein the initial organosilicon compound (A) has the general formula:

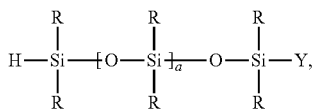

and the organosilanol compound has the general formula:

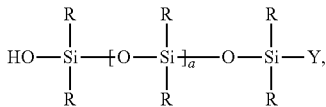

where each R is an independently selected hydrocarbyl group; Y comprises a functional moiety selected from alkoxysilyl moieties, epoxide moieties, and acryloxy moieties, with the proviso that Y is other than the acryloxy moieties when the catalyst (C) is (C3) Pd/C; and subscript a is 0 or 1.

2. The method of claim 1, wherein each Y is independently of formula-D-$R^1$, where D is a divalent linking group and $R^1$ comprises an alkoxysilyl group, an acryloxy group, or an epoxide group.

3. The method of claim 2, wherein $R^1$ is an alkoxysilyl group of the formula:

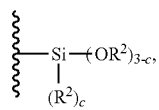

where each $R^2$ is an independently selected hydrocarbyl group; and subscript c is 0, 1, or 2.

4. The method of claim 3, wherein: (i) each $R^2$ is independently selected from —$CH_3$ and —$CH_2CH_3$; (ii) subscript c is 0; or (iii) both (i) and (ii).

5. The method of claim 2, wherein $R^1$ is an epoxide group having one of formulas (I) and (II):

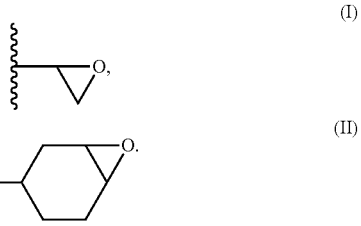

6. The method of claim 2, wherein $R^1$ is an acryloxy group of the formula:

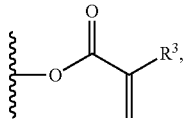

where $R^3$ independently selected from hydrocarbyl groups and H.

7. The method of claim 6, wherein $R^3$ is H or —$CH_3$.

8. The method of claim 2, wherein: (i) divalent linking group D comprises a hydrocarbon group of formula —$(CH_2)_m$—, where subscript m is from 1 to 6; (ii) divalent linking group D comprises an ether moiety; or (iii) both (i) and (ii).

9. The method of claim 1, wherein: (i) each R is —$CH_3$; (ii) subscript a is 0; or (iii) both (i) and (ii).

10. The method of claim 1, wherein reacting the initial organosilicon compound (A) and water (B): (i) forms a reaction product comprising the organosilanol compound, and wherein the method further comprises isolating the organosilanol compound from the reaction product; (ii) is performed in the presence of (D) a reaction inhibitor; or (iii) both (i) and (ii).

* * * * *